(12) United States Patent
Fryer

(10) Patent No.: US 6,231,972 B1
(45) Date of Patent: May 15, 2001

(54) ADHESIVE ABRASION-RESISTANT PROTECTIVE HOOF COATING

(76) Inventor: David Thomas Fryer, 240 W. Race St., Fleetwood, PA (US) 19522

( * ) Notice: Subject to any disclaimer, the term of this patent is extended or adjusted under 35 U.S.C. 154(b) by 0 days.

(21) Appl. No.: 09/389,614

(22) Filed: Sep. 3, 1999

(51) Int. Cl.[7] ................. B32B 15/04; B32B 7/12
(52) U.S. Cl. ................... 428/343; 428/413; 604/60; 604/61
(58) Field of Search ................... 428/343, 413; 604/60, 61

(56) References Cited

U.S. PATENT DOCUMENTS

| | | | |
|---|---|---|---|
| 3,118,449 | * 1/1964 | Bane | 128/336 |
| 3,682,179 | * 8/1972 | Firth et al. | 128/82 |
| 4,182,340 | * 1/1980 | Spencer | 128/336 |
| 5,681,350 | * 10/1997 | Stovall | 606/212 |
| 5,699,861 | * 12/1997 | Sigafoos | 168/17 |

* cited by examiner

Primary Examiner—Morton Foelak

(57) ABSTRACT

Described is an adhesive abrasion-resistant protective coating for an ungulate hoof comprising a rapid-setting epoxy resin with a curing agent with the addition of aramid fibers and carbide particles for added strength and abrasion resistance. The composition is flexible, has a hardness of about 85 on a Shore D scale and is very abrasion resistant. The composition is used to protect ungulate hooves from abrasion without the need for nails or other fastening devices. Also described is the use to create traction enhancing features, and to fill cracks in the hoof wall.

5 Claims, No Drawings

ADHESIVE ABRASION-RESISTANT PROTECTIVE HOOF COATING

BACKGROUND OF THE INVENTION

1. Field of the Invention

The present invention relates in general to animal husbandry and in particular to a protective coating for an ungulate hoof.

2. The Description of Prior Art

The practice of furnishing hoof protection for horses dates back approximately 5,000 years, while protection for other draft animals such as oxen dates back even further. The ancient Egyptians used woven grass and reeds tied to the hooves. The early Greeks, Romans and Celts used a "hipposandal" which was a leather sandal to which was attached a bronze, and later, an iron sole held on with leather straps. The first evidence of iron horseshoes and ox or goat shoes fastened with nails can be traced to the $5^{th}$ or $6^{th}$ century B.C. Basically, this method of installing protective footwear on animals has remained virtually unchanged to this day.

The development of modem adhesives has created new opportunities in horseshoe practices. Jones, et.al. (U.S. Pat. No. 4,496,002) and Rose (U.S. Pat. No. 4,972,909) describe an ethylene polymer horseshoe fastened with nails, while Ford (U.S. Pat. No. 4,513,824) used screws to fasten plastic horseshoes. Klimko (U.S. Pat. No. 5,048,614) improved the wear capabilities of plastic shoes with metal reinforcing inserts. These horseshoes, while utilizing more modem technology, are still held on by nails which can become loose and allow the shoe to come off, often tearing the hoof wall in doing so.

Several patents have described the use of modern adhesives to install plastic shoes. Tovim (U.S. Pat. No. 4,346,762), Cameron (U.S. Pat. No. 4,690,222), Stubbe (U.S. Pat. No. 4,819,731), Thoman (U.S. Pat. No. 4,892,150), Igrow (U.S. Pat. No. 5,129,461), Dallmer (U.S. Pat. No. 5,148,872), Constantino, et. al. (U.S. Pat. No. 5,692,569) and Sigafoos (U.S. Pat. No. 5,638,905 and 5,699,861) all describe a series of tabs or sheet projecting upwards from a shoe which are adhered to the dorsal hoof wall surface. Schaffer (U.S. Pat. No. 5,213,163) describes an L-beam cross-section polyurethane shoe which is hot-attached with adhesive.

Two variations are described, one by Tennant (U.S. Pat. No. 4,765,411) in which an ultraviolet cured acrylic horseshoe is formed in a prefabricated mold. Sergei (U.S. Pat. No. 5,129,461) described a plastic horseshoe with an upper edge, which could be shrink-fitted by the application of heat.

All of these developments however still comprise the installation of a solid horseshoe. These shoes all can become loose, come off and, in many cases, cause damage to the horse's hoof where they were attached by breaking off pieces of hoof wall. This is a very prevalent cause of lameness in horses.

Excessive hoof wear in domesticated ungulates due to a lack of hoof protection can cause lameness which in turn can be a cause of loss in milk production in cows, sheep and goats; and unnecessary premature loss of life in other livestock. Zoo animals also need hoof protection due to the concrete or hard-packed surfaces of their enclosures.

BRIEF SUMMARY OF THE INVENTION

My protective hoof coating is a rapid-setting adhesive formula which, when easily applied to the ground contacting surface of an unshod ungulate (any hoofed animal), furnishes a flexible, abrasive-resistant, protective surface to minimize hoof wear. The coating also furnishes a traction-enhancing surface to assist the animal's travel on slippery ground surfaces. The coating can be used to furnish traction assisting features and also to fill in broken areas of the hoof wall.

Excessive hoof wear from moving over abrasive surfaces without hoof protection can cause lameness in any hoofed animal, particularly domesticated ones. Previously, in order to furnish hoof protection it was required to fasten that protection (metal or plastic shoes) mechanically by nails or glue which could itself cause damage to the hoof. By making holes upon installation, or by the shoe coming off and breaking the hoof wall, or in removal of the shoe the hoof wall is damaged and weakened. An advantage of the present invention is that it is itself an adhesive and will not damage the hoof in those ways. The present invention entails no shoe to come off and no nails to weaken the hoof.

The principle object of the present invention is to create a protective coating on the ground-contacting portion of an ungulate hoof. Another object of the present invention is to create a non-slip surface suitable to whatever surface on which the animal is expected to travel. Another object of the present invention is to allow the capability to create traditional corrective and traction devices such as toe grabs, heel caulks, wedge heels or any additional features found necessary to the function of a protective shoe. Another object of the present invention is to fill broken areas of the hoof wall. The features and advantages of the present invention will become apparent from the following detailed description of the invention.

DETAILED DESCRIPTION OF THE INVENTION

The preferred embodiment of the present invention follows the correct preparation of the hoof by one skilled in the art of hoofcare. The hoof wall must be trimmed and leveled to the proper angles nonnally used to prepare the hoof to the correct shape depending on which endeavor for which the animal is expected to be used (i.e. racing, driving, junping, gaming, shows, etc.)

Following trimming, the hoof must be prepared for the adhesive. The hoof surface should be roughened either with a rasp or sandpaper wherever the adhesive will be applied. The surface must be clean, dry and free of oils or solvent residue. The surface to be coated should be cleaned using denatured alcohol or water. This can then be dried with a heat gun set on about 250 degrees Fahrenheit. The heat will also warm the hoof, opening the pores for better wetting of the surface by the adhesive.

The preferred composite to be applied to the hoof is a fast-cure epoxy resin formulation. The resin formulation selected is a hard (about 85 Shore D hardness) abrasive-resistant coating resin with an additive resin for flexibility. To this resin formulation is added thixotropic fibers such as aramid fibers as filler and for increased tensile strength. Fine grit (about 200 grit) abrasive-resistant particles, such as silicone carbide, are added for increased traction and abrasion resistance. A rapid-setting curing agent is used due to the limited allowable time the animal can hold its foot up. The mixture is held in a two-part cartridge dispenser with resin in one side and curing agent in the other with the fiber and particle additives in both sides or either side. The mixture is dispensed using a static mixing nozzle which thoroughly combines the components prior to application.

While the hoof is held upside down the protective composite is applied in a thin, even layer. The hoof should be coated from the outside edge of the hoof wall to the inside of the hoof wall on the ground-contacting surface of the hoof. A protective coating can also be applied to the sole on any ungulate. In addition, the protective composite can be applied with a brush to fill previously broken or chipped areas of the upper or dorsal hoof. The hoof should be cured in that elevated position with a heat gun set on about 250 degrees Fahrenheit in about a minute or until it is no longer tacky to the touch. Additional heat application time will accelerate the final cure. If at this time additional thicknesses are desired the protective composite can be reapplied over the thin layer. If the hoof has been set down on the ground and becomes dirty or contaminated, the applied protective layer can be cleaned with denatured alcohol before further applications. Such features as toe grabs or heel caulks, applied as additional thicker layers can be added easier and more securely on top of a preliminary thin layer. Alternatively, if more traction is required, coarser grit (about 20 grit) particles can be applied to the surface of the adhesive, or the hoof can be set down in a pile of the coarser particles until cured.

Removal of the protective hoof coating involves simply trimming above the coating when the hoof grows out; a routine procedure of the hoof maintenance program. The coating can then be replaced.

While the above description contains detailed specifications and instructions, these should not be construed as limitations on the scope of the invention, but rather as an exemplification of one preferred embodiment thereof. Many other variations are possible, such as different adhesive formulations or different methods of application such as aerosol spray. Accordingly, the scope of the invention should be determined not by the embodiment illustrated, but by the appended claims and their legal equivalents.

What is claimed is:

1. A protective coating for an ungulate hoof comprising an abrasive-resistant adhesive applied to the underside, or ground-contacting, surface of said hoof for the purpose of furnishing protection against abrasion and wear from the ground surface.

2. the protective coating of claim 1 wherein said abrasive-resistant adhesive coating is comprised of an epoxy resin and a curing agent.

3. the protective coating of claim 1 further including aramid fibers as a thixotropic and strengthening agent.

4. the protective coating of claim 1 further including carbide particles for increased abrasion resistance and traction.

5. the protective coating in of claim 1 wherein the coating is used to form additional features comprising toe grabs, heel caulks, and built-up heels.

* * * * *